[19] United States Patent
Weady et al.

[11] 4,013,166
[45] Mar. 22, 1977

[54] HYDRAULIC DRIVEN PULLEY FOR CONVEYORS

[75] Inventors: Andrew A. Weady, Los Gatos; Jerome T. Denz, Tiburon, both of Calif.

[73] Assignee: Hydraulic Drives, Inc., Burlingame, Calif.

[22] Filed: Nov. 10, 1975

[21] Appl. No.: 630,367

[52] U.S. Cl. .............................. 198/835; 29/115; 198/788

[51] Int. Cl.[2] ........................ B65G 23/08

[58] Field of Search .......... 198/127 R, 127 E, 203, 198/788, 835; 418/102; 74/230.01, 421 A; 29/115, 116 R

[56] References Cited
UNITED STATES PATENTS

| 1,733,379 | 10/1929 | Löwy | 198/127 E |
| 2,736,209 | 2/1956 | Christian | 198/203 X |
| 2,941,411 | 6/1960 | Wilhelm et al. | 198/203 X |
| 3,112,655 | 12/1963 | Hobbs et al. | 74/421 A |
| 3,150,768 | 9/1964 | Muller | 198/203 |
| 3,376,758 | 4/1968 | Mackay | 198/203 X |
| 3,568,821 | 3/1971 | Gronkvist | 198/127 R |

FOREIGN PATENTS OR APPLICATIONS
862,430 2/1971 Canada .................. 198/203

Primary Examiner—Evon C. Blunk
Assistant Examiner—Richard K. Thomson
Attorney, Agent, or Firm—Julian Caplan

[57] ABSTRACT

A hydraulic motor encased with a pulley drives the pulley and thereby drives a belt conveyor. The motor is encased in a stationary housing and is driven by fluid pumped from an external source through a stationary first shaft into the interior of the pulley. The first shaft and a second stationary shaft are supported by brackets which sustain the weight of the assembly. The pulley revolves on bearings on the two shafts. The inner end of the first shaft is supported by one end of the motor housing and the inner end of the second shaft by bearings in a drive flange which is fixed to the motor shaft and to an internal partition of the pulley. The partition is apertured and communicates with a discharge duct in the second shaft so that fluid leaking in the interior of the pulley is discharged.

3 Claims, 4 Drawing Figures

HYDRAULIC DRIVEN PULLEY FOR CONVEYORS

This invention relates to a new and improved hydraulic driven pulley for conveyors. The pulley is particularly suitable for installations where strict sanitary conditions prevail, such as food processing plants.

An advantage of the invention is the fact that the motor which drives the pulley is installed inside the pulley and thus space is saved. Preferably the motor is not electric but rather is hydraulic fluid driven and thus the possibility of electric shock is eliminated.

Another feature of the location of the motor within the pulley is the elimination of external rotating shafts.

Another advantage of the construction hereinafter described is the absence of noise.

A further advantage of the construction is the sanitary nature thereof which is particularly desirable in food and beverage processing plants. The pulley may be hosed down when the processing line is stopped without danger of damage to the pulley and the elements which are located inside the pulley. Further, bacteria are not likely to multiply within the pulley and in the event that bacteria should contaminate the interior of the pulley such bacteria are not communicated to the exterior or to the conveyor belt.

In the event of leakage of hydraulic fluid within the pulley, a leakage discharge duct is provided which leads the fluid away from the conveyor belt so that the latter is not contaminated.

Other objects of the present invention will become apparent upon reading the following specification and referring to the accompanying drawings in which similar characters of reference represent corresponding parts in each of the several views.

Figure 1:
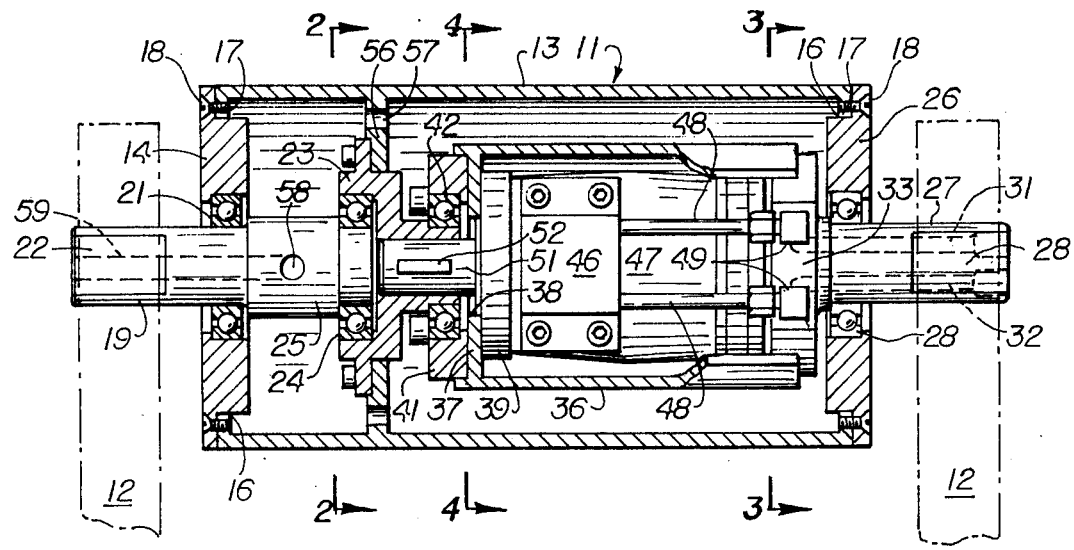
FIG. 1 is a horizontal midsectional view through the pulley and its associated mechanisms.
Figure 3:
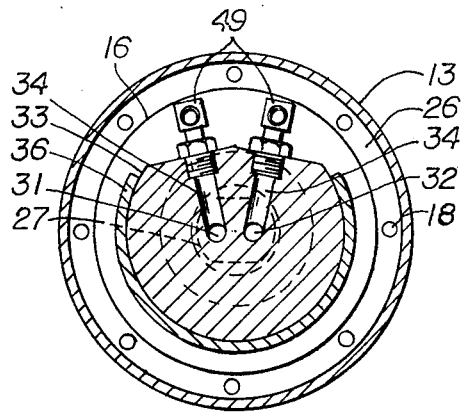
FIG. 3 is a vertical sectional view taken substantially along the line 3—3 of FIG. 1.
Figure 2:
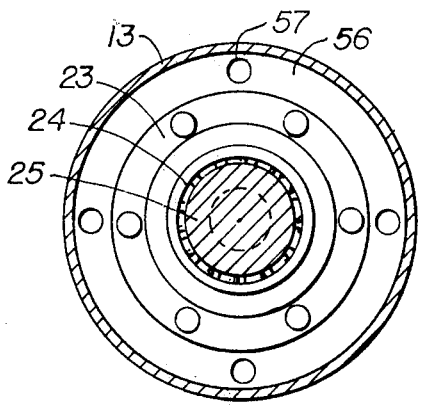
FIG. 2 is a vertical sectional view taken substantially along the line 2—2 of FIG. 1.
Figure 4:
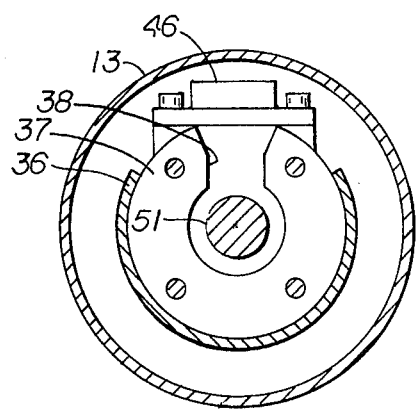
FIG. 4 is a sectional view taken substantially along the line 4—4 of FIG. 1.

Pulley 11 is mounted on stationary support brackets 12 shown schematically in FIG. 1. Most of the elements hereinafter described are encased within a cylindrical shell 13 which drives a conveyor belt (not shown) in conventional manner. A left end cap 14 closes off the left end of shell 13 as viewed in FIG. 1, the cap being formed with a rabbet 16. The end of shell 13 has an inward turned flange 17 fitting into rabbet 16 so that external screws 18 secure the cap 14 to the shell 13. Left shaft 19 extends from the interior through a bearing 21 in cap 14 and is formed with diametrically opposed flats 22 which are engaged by bracket 12 in a manner well understood in this art. The inner end of left shaft 19 is supported by annular drive flange 23 with bearing 24 interposed. The shaft 19 is formed with an enlargement 25 intermediate the bearings 21, 24 to secure the shaft 19 in place.

Right end plug 26, which is similar in construction to plug 14, closes off the right end of shell 13 as viewed in FIG. 1. Right shaft 27 extends from the interior of shell 13 through a bearing 28 in cap 26 and is formed with opposed flats 28 and secured thereby to the right bracket 12. A pair of longitudinally extending ducts 31, 32 are drilled from the right hand end of shaft 28.

Hydraulic fluid is pumped into the system through duct 31 and returned to the pump through duct 32.

Stationary within the interior of shell 13 is a motor housing 36 which is U-shaped in cross section and has at its left-hand end, as viewed in FIG. 1, a member 37 which is also U-shaped. Slot 38 is formed in member 37 for installation of the motor as hereinafter set forth. The right end 33 of housing 36 has vertical ducts 34 communicating with ducts 31, 32. Adjacent the left-hand end of motor 46 is a flange 39 which abuts end 37. Motor shaft 51 extends through end 37 and outward of bearing housing 41 having a bearing 42 in which the neck of drive flange 23 rotates. Thus the motor 46 can be dropped into the housing 36 using slot 38.

Motor 46 is a low-speed high-torque motor. The internal structure of said motor is not illustrated and described since it is a commercially available item. Motor 46 is suitably fixed to housing 36 by any convenient means. At its left end, as viewed in FIG. 1, is a manifold through which hydraulic fluid flows to the interior of the motor to drive the same. A pair of horizontal tubes 48 connects the manifold 47 with elbow fittings 49 which communicate with the ducts 34. Thus fluid for the motor 46 enters through duct 31 thence through one of the ducts 34 to one of the elbows 49 and a tube 48 to the manifold 47. The return from motor 46 travels from manifold 47 through the other tube 48 and elbow 49 and duct 34 to the duct 32.

The shaft of motor 46 extends to the left as viewed in FIG. 1 and is keyed by key 52 to drive flange 23. Hence as the motor 46 turns, it turns flange 23 which is fixed to partition 56 which in turn is attached to the shell 13 and hence the shell is driven.

Partition 56 which is welded to the interior of shell 13 and is bolted to drive flange 23 is preferably formed with a plurality of holes 57. The enlargement 25 of left shaft 19 is formed with a radial duct 58 which communicates with longitudinal duct 59 extending out the left end of shaft 19. Hence if there is any leakage of fluid inside the shell 13 it is discharged through duct 59 and does not contaminate the shell 13 or the conveyor which is driven thereby.

What is claimed is:

1. A conveyor pulley comprising a cylindrical shell for a conveyor belt, a first and a second shaft adapted to be stationarily held in support means, first and second means for rotatably mounting said shell relative to said first and second shafts, respectively, a fluid motor located entirely within said shell and having a motor shaft and a manifold having fluid intake and outlet ports, a drive member fixed to said motor shaft and to said shell whereby rotation of said motor shaft turns said shell, a stationary motor support entirely within said shell in which said motor is mounted, said drive member being rotatable relative to said motor support, said second shaft formed with first and second longitudinal ducts, conduit means connecting said first and second ducts with said fluid intake and outlet ports, said motor support comprising a trough-like U-shaped member in which said motor is fitted, said U-shaped member having a bearing cap at a first end through which said drive member and said motor shaft extend and a second end fixed to said U-shaped member through which said second shaft extends, the inner end of said second shaft being supported by said second end, said U-shaped member having an internal first flange at the inner end, said first flange being formed with a slot longer than said first shaft, said motor being supported by said U-shaped member, the inner end of said motor having a second flange fitting tightly against one surface of said first flange, said bearing cap fitting tightly against the surface of said first flange opposite said second flange, said slot providing an opening through which the shaft of said motor may be inserted during installation of said motor.

2. A pulley according to claim 1 in which said drive member comprises an annular third flange fixed to said motor shaft, an annular internal fourth flange on said shell intermediate the ends of said shell and spaced from said first flange and detachable means securing said third flange and internal fourth flange for rotation together.

3. A pulley according to claim 1 in which said first shaft is formed with a substantially radial duct and a third longitudinal duct extending out the end of said first shaft to the exterior, said radial and third longitudinal ducts intercommunicating, whereby fluid leaking into said shell from said motor or said conduit means escapes to the exterior of said shell without contamination of the exterior of said shell.

* * * * *